3,657,154
MICROSPHERICAL ZEOLITIC CRACKING
CATALYST
Walter L. Haden, Jr., Metuchen, and Frank J. Dzierzanowski, Somerset, N.J., assignors to Engelhard Minerals & Chemicals Corporation, Woodbridge Township, N.J.
No Drawing. Continuation-in-part of application Ser. No. 416,925, Dec. 8, 1964. This application Sept. 9, 1969, Ser. No. 856,458
The portion of the term of the patent subsequent to Apr. 14, 1987, has been disclaimed
Int. Cl. B01j *11/40*
U.S. Cl. 252—455 Z     3 Claims

ABSTRACT OF THE DISCLOSURE

A zeolitic molecular sieve cracking catalyst composition in the form of small, highly attrition-resistant, essentially spherical particles (microspheres) is composed of ion-exchanged synthetic crystalline faujasite and an alkali-leached, alumina-enriched, silica-alumina residue of kaolin clay which had previously been calcined at elevated temperature.

RELATED APPLICATIONS

This application is a continuation-in-part of the following copending U.S. patent applications:
Ser. No. 738,384, filed June 20, 1968, which is a continuation-in-part of copending applications Ser. No. 416,925, filed Dec. 8, 1964, now U.S. 3,391,994, issued July 9, 1968 and Ser. No. 698,400, filed Jan. 17, 1968, now U.S. 3,503,900.
Ser. No. 810,325, filed Mar. 25, 1969, which is a continuation-in-part of Ser. No. 738,384.

BACKGROUND OF THE INVENTION

Catalysts for fluid hydrocarbon conversion processes, e.g., cracking catalysts, are frequently supplied in the form of very small essentially spherical particles predominantly within the range of 100/325 mesh (Tyler). These particles are usually called "microspheres." The microspheres must possess certain properties among which is hardness, especially resistance to attrition. The particles must also possess adequate activity and selectivity as well as thermal and steam stability.

Highly active and selective cracking catalysts have been prepared by incorporating finely divided crystals of certain crystalline zeolitic aluminosilicates of the molecular sieve type with suitable matrix material such as clay or silica-alumina gels. Ion-exchanged synthetic faujasite (zeolite X or zeolite Y) is a suitable crystalline zeolite.

Faujasite may be synthesized from dilute high purity sources of $Na_2O$, $Al_2O_3$ and $SiO_2$. It may also be synthesized by reacting sodium hydroxide solution with calcined kaolin clay. However, in order to obtain faujasite, rather than other zeolitic molecular sieves, the clay must be calcined at relatively high temperature and undergo the characteristic kaolin exotherm. The incorporation of small amounts of kaolin clay calcined at lower temperature ("metakaolin") may aid in the crystallization of the faujasite but, when used as the sole source of silica and alumina, does not result in the crystallization of faujasite.

Microspherical zeolitic cracking catalyst particles have been obtained by forming a slurry of previously formed powdered zeolite crystal with dilute silica hydrosol or alumina-silica hydrosol and spray drying the slurry. Catalyst particles obtained by such processing are expensive since expensive high purity materials are required to prepare the zeolite and a separate binding step is required. The attrition resistance of the products obtained by binding sieve crystals generally leaves something to be desired.

Attempts have also been made to form zeolitic molecular sieve compositions from preformed bodies of essentially the same size and shape as the finished catalyst particles. This has been successfully accomplished by extruding a mixture of caustic solution and clay material, part of which is anhydrous and calcined, and part of which is hydrated. The extruded pellets, generally in the shape of cylinders, are subjected to hydrothermal treatment without dehydration. Faujasite crystallizes in situ in the presence of hydrated kaolin clay as a result of the reaction between the caustic and the calcined clay in the pellets. A feature of the process is that reaction and crystallization are carried out in the absence of an external aqueous phase in contact with the pellets. Thus, there is no extraction of constituents of the pellets. The catalyst product obtained by ion-exchanging and activating the crystallized product has a $SiO_2/Al_2O_3$ mole ratio of about 2/1—i.e., essentially the same ratio that present in kaolin clay.

Great difficulty has been experienced in preparing crystalline zeolitic molecular sieve composite catalysts in the form of microspheres by the in situ process above described. Problems have been encountered in obtaining discrete microspheres and in crystallizing faujasite from preformed particles containing caustic solution and a mixture of calcined kaolin clay and hydrated kaolin clay. Especial difficulty has been encountered in obtaining small spherical particles of desired resistance to attrition. One reason for the difficulties is that when faujasite is crystallized in situ in the presence of hydrated kaolin in microspherical preforms the small spheres tend to agglomerate and stick to each other during reaction and crystallization. On the other hand, impregnation of caustic solution into preformed microspheres composed of the mixture of hydrated and calcined clay tends to result in the mechanical breakdown of the preforms unless great care is exercised. When caustic is included in the feed to the spray dryer so that it is present in the preformed microspheres, part of the caustic tends to react with combustion gases in the spray dryer and difficulty may be experienced crystallizing the zeolite.

THE INVENTION

An object of this invention is to produce a novel fluid zeolitic molecular sieve catalyst composition in the form of microspheres which are characterized by outstanding resistance to attrition.

Another object is to provide a method for cracking gas oil feedstock to produce gasoline.

The novel cracking catalyst of the present invention is in the form of small essentially spherical, attrition-resistant particles composed of a mixture of ion-exchanged synthetic crystalline faujasite and an amorphous porous silica-alumina obtained as an alkali-leached residue of calcined kaolin clay, the calcined clay having been obtained by calcining hydrated kaolin clay under conditions of temperature and time such that the clay underwent the characteristic kaolin exotherm.

The catalyst, after thermal activation, is eminently suitable for use in cracking gas oil feedstock to produce gasoline. The product possesses high selectivity towards gasoline with low coke production and it operates at a high level of activity. It has outstanding resistance to deterioration by high temperature steam.

The microspherical catalyst may be prepared in accordance with the invention described and claimed in U.S. 3,506,594 (supra), by mixing hydrated kaolin clay (or a mixture of hydrated and calcined clay) in water, spray drying the mixture to form microspheres, calcining the microspheres to dehydrate the hydrated kaolin clay at a temperature (e.g., 1600° F. to 2200° F.) and for a time such that clay material in the microspheres undergoes or passes through the characteristic kaolin exotherm. As a result of calcination under such conditions, essentially all of the clay is dehydrated and put into a state or condition such that a portion of it will react with sodium hydroxide solution to form crystalline faujasite. Moreover, the microspheres became remarkably attrition-resistant as a result of the high temperature heat treatment, and certain difficulties encountered in crystallizing the faujasite from preformed microspheres containing hydrated clay are obviated. The calcined silica-alumina microspheres are suspended in an aqueous solution of an alkali metal hydroxide, especially sodium hydroxide and, while the aqueous suspension is agitated, it is heated mildly and then heated at more elevated temperature until hydrated sodium faujasite crystals form in the microspheres as a result of reaction between the aqueous reaction liquid and alumina and silica in the microspheres. During the hydrothermal treatment an appreciable amount of silica is leached from the microspheres, forming a sodium silicate mother liquid from which the crystallized microspheres are separated. After separation from the mother liquid, the microspheres are ion-exchanged to reduce the alkali-metal content. Ammonium ions, magnesium ions, rare earth ions and mixtures are examples of suitable exchanging cations. Before or during use the microspheres are activated by heat treatment.

Such method differs from the prior art method of making a composite zeolitic catalyst which features the reaction between caustic solution and the calcined clay in situ in the presence of hydrated kaolin clay, the caustic being present in the original preforms and the reaction being carried out without leaching of constituents of the preforms.

The catalyst may also be prepared in accordance with an embodiment of this invention described and claimed in Ser. No. 810,325 (supra). In accordance with the teachings of this patent application, a small amount of metakaolin is also incorporated in the reaction mixture, such metakaolin being in the form of particles separate from the calcined microspheres which underwent the exotherm.

DETAILED DESCRIPTION

Catalyst particles of the present invention analyze at least 90% by weight combined $SiO_2$ plus $Al_2O_3$ (on a volatile-free of V.F. weight basis), the $SiO_2/Al_2O_3$ molar ratio in the particles being about 1/1, e.g., 0.8 to 1.4/1. Typical $Al_2O_3$ and $SiO_2$ analyses are, respectively, within the range of 50% to 65% by weight and 30% to 50% by weight (V.F. basis). Volatile-free weight represents the weight of a material remaining after such material has been heated to essentially constant weight at 1800° F.) The particles are readily distinguishable from other catalysts, including zeolitic catalysts, by the fact that the $Al_2O_3$ content and the $Al_2O_3/SiO_2$ ratio are unusually high. Other zeolitic catalysts usually contain appreciably less than 50% $Al_2O_3$ and have appreciably lower $Al_2O_3/SiO_2$ ratios. The particles of our catalysts may contain $Na_2O$ in amount up to 10% by weight (V.F. basis), generally less than 3% $Na_2O$ and, most preferably less than 1% $Na_2O$. They may also contain traces of amorphous or crystalline impurities normally associated with high purity kaolin clay, e.g., titanium dioxide. When the catalyst product is obtained by using ammonium ions as the sole exchanging ions, the activated catalyst will be composed essentially of silica, alumina and small amounts of sodium oxide. When nonvolatile cations such as magnesium ions are rare earth ions were used to ion-exchange the sodium-form catalyst intermediate, the particles may contain the oxide of such metal(s) in amount up to about 10% by weight (V.F. basis).

The zeolitic constituent of the catalyst is faujasite (zeolite X or zeolite Y) and may be present in the catalyst particles in amount within the range of from 1% to 70% (as determined by X-ray diffraction). Generally from 10% to 50% faujasite is preferred. Preferably, the faujasite is zeolite Y having a $SiO_2/Al_2O_3$ mole ratio above 4.0 (as determined by X-ray diffraction). All X-ray diffraction data mentioned herein refer to values obtained by the procedure and with the equipment described in U.S. 3,391,994 to Haden et al. Faujasite is generally the sole crystalline material that is present in an X-ray diffraction pattern of the product. In some cases small amounts of so-called "zeolite B" may be present. The latter zeolite is described in U.S. 3,008,803.

The nonzeolite portion of the catalyst is a porous amorphous alumina-enriched silica-alumina residue of caustic leached calcined kaolin clay. Such residue has a lower $SiO_2/Al_2O_3$ mole ratio than either faujasite or kaolin clay, as evidenced by the fact that the particles include a zeolite which has a higher $Si_2O/Al_2O_3$ mole ratio than kaolin clay but have an overall $SiO_2/Al_2O_3$ ratio that is a fraction of that of kaolin clay.

Representative catalyst products are composed of particles preponderantly within the range of 100 to 325 mesh (Tyler). Such particles have a pore volume of about 0.5 cc./gm. and a bulk density within the range of 0.7 to 1.0 g./cc. (activated form of the catalyst). The particles have outstanding resistance to attrition when tested by various test procedures which measure the hardness of particles under conditions of attrition simulating those encountered in fluid cracking processes.

The particles may be supplied with the ion-exchanged zeolite component in the hydrated condition in which it was synthesized. Alternatively, the particles may be supplied with the faujasite in dehydrated (activated) form.

The catalyst particles are adapted for use in fluid bed processes for cracking conventional gas oil feedstocks to produce gasoline. The catalyst has outstanding activity and is highly selective to the production of gasoline when used under conventional cracking conditions. The catalyst is unusually resistant to high temperature steam and is highly active and selective even after being subjected to steam treatments which would impair the activity and/or selectivity of other zeolitic catalysts. As a result of the fact that the catalyst particles are unusually attrition-resistant, catalyst losses during use and regeneration are reduced.

The following examples are given to illustrate further the invention and to point out distinguishing features of the novel cracking catalyst compositions.

EXAMPLE I

A novel fluid zeolitic molecular sieve cracking catalyst of the invention was prepared by the following procedure.

Three hundred and seventy-eight parts by weight of powdered hydrated Georgia kaolin clay was blended with 126 parts by weight of "Satintone No. 1," 27 parts by weight of "Satintone No. 2," 28.0 parts by weight of sodium silicate solution and 436 parts by weight distilled water. "Satintone No. 2" is a commercial metakaolin pigment obtained by thermally dehydrating high purity kaolin clay under conditions such that the clay undergoes an endothermic reaction associated with the loss of chemically held water but does not pass through the kaolin exotherm. "Satintone No. 1" is also a commercial calcined clay pigment and is produced by calcination at higher temperature than used to prepare metakaolin; the clay undergoes the exothermic reaction in the preparation of this pigment. The hydrated kaolin clay was a fine size fraction of water-washed, low iron kaolin clay. The hydrated and calcined clays had a $SiO_2/Al_2O_3$ molar ratio of about 2.0. The sodium silicate that was used contained 38% solids and had a $Na_2O/SiO_2$ weight ratio of 1:3.2.

The ingredients were thoroughly mixed with a "Lightnin' Mixer," producing a fluid slip containing 56% solids and having a density of 1.5 kg./l.

The slip was spray dried in a 5 x 5 ft. gas-fired spray dryer using an atomizer wheel speed of 15,760 r.p.m. Air inlet and outlet temperatures were approximately 1100° F. and 450° F., respectively.

The minus 60 mesh (Tyler) fraction of the microspheres was calcined in a muffle furnace at 1800° F. for 2 hours to remove chemically bonded water from the raw clay and to cause the raw clay and "Satintone No. 2" clay to undergo the kaolin exotherm. "Satintone No. 1" had already been dehydrated and had undergone the exotherm.

Sodium hydroxide pellets (23.6 gm.) were dissolved in 144 ml. of distilled water. After the resulting 14% solution had cooled to about 105° F., 100 gm. of the microspheres were slowly added to the caustic solution in a 3-neck round bottom flask. The flask was fitted with a thermometer and a water-cooled condenser through which an agitator extended with the impeller near the base of the flask. The fluid mixture was maintained at 100° F.±20° F. for 24 hours while the agitator was in operation. After 22 hours of mixing at 100° F., the temperature was raised to 180° F. and maintained at that temperature while agitation was continued. Samples were periodically removed from the flask with a pipette. The samples were filtered in Buchner funnels and washed with distilled water and dried.

The sample that had been crystallized by heating at 180° F. for 30 hours contained 16.7% sodium zeolite Y having a $SiO_2/Al_2O_3$ mole ratio of 5.0. A trace of zeolite B (estimated at 2%) was also present.

The crystallized microspheres were exchanged by percolation in a 6½" chromatography column with a 1 N aqueous solution of ammonium nitrate. The ratio of $NH_4+$ in solution per equivalent of $Na+$ in the microspheres was about 1.8. After the exchange, the product was washed with distilled water to remove entrained exchange solution. The ion-exchanged microspheres were dried at 200° F. for 18 hours.

A sample of 100–270 mesh (Tyler) microspheres that had been ion-exchanged with ammonium nitrate was activated by calcination in a muffle furnace at 1100° F. for 4 hours.

The attrition-resistance of the 200–270 mesh fraction of the calcined catalyst was measured by the following procedure.

A volume of the heat-treated catalyst (0.661 cc.) and 0.5 g. of 14/20 mesh (U.S. Standard Sieve) silica sand were placed in a 2 cc. vial of a Wig-L-Bug grinding mill and the mill was operated for 5 seconds. (The Wig-L-Bug grinding mill is a product of Spex Industries and is described in Catalog No. 5000 of that company.) The sample was then screened and the percentage of minus 325 mesh material was reported as the percent weight loss.

The test was repeated in 5 second increments on the plus 325 mesh portions of the remainder of the sample. A plot of percent weight loss vs. time was obtained. The slope of curve at 20% loss was designated the "attrition rate."

The attrition rate for the experimental catalyst was 1½%/sec., which rate is comparable to that of the most attrition-resistant zeolitic fluid catalyst commercially available.

EXAMPLE II

The procedure of Example I was carried out on a larger scale. Analysis of intermediates, mother liquor and the catalyst product was made.

After crystallization for 26½ hours at about 180° F., the product contained 22.6% sodium zeolite Y having a $SiO_2/Al_2O_3$ mole ratio of 4.53. The dried intermediate had a L.O.I. (at 1800° F.) of 26.98% and had the following analysis (volatile-free weight basis): $Na_2O$, 6.61%; $Al_2O_3$, 56.64%; $SiO_2$, 32.94%; $TiO_2$, 2.53%; $Fe_2O_3$, 0.67%.

The $SiO_2/Al_2O_3$ molar ratio of this product was therefore about 1/1. Since the $SiO_2/Al_2O_3$ molar ratio of the calcined microspheres was about 2/1, about half of the silica in the microspheres had been extracted and passed into the mother liquor during the preparation of the intermediate. This was confirmed by an anslysis of the mother liquor which was found to have a $Na_2O$ concentration of 86 g./l., $Al_2O_3$ concentartion of 1.66 g./l. and $SiO_2$ concentration of 172 g./l.

After ion exchange, the product analyzed (volatile-free weight basis): 1.02% $Na_2O$ by weight; $SiO_2$, 35.10%; $Al_2O_3$, 60.35%; $Fe_2O_3$, 0.68%; $TiO_2$, 2.62%.

The cracking catalyst obtained vy calcined the ammonium exchanged microspheres had a bulk density of 0.695 kg./l., an attrition rate of 2.6%/sec. and had an outstanding activity and selectivity when tested by the CAT-D cracking test.

Thus, fluid microspheres of outstanding hardness and desirable composition for catalytic cracking purposes were inexpensively obtained from microspheres composed of calcined kaolin clay.

EXAMPLE III

The following tests were carried out to illustrate further the prepartion of fluid catalysts in accordance with this invention.

An aqueous slurry of a fine size uncalcined No. 2 paper coating grade of hydrated kaolin clay was deflocculated with tetrasodium pyrophosphate in amount of about 0.3% of the weight of the clay. The slurry was spray dried as in Example I. One portion of the microspheres was calcined in a muffle furnace at 1800° F. for 2 hours to produce "Microspheres A." Another portion was separately calcined in the muffle furnace at 1350° F. for 2 hours ("Microspheres B").

A part of microspheres calcined at 1350° F. was blended with microspheres calcined at 1800° F. in proportion of 10 parts by weight to 90 parts by weight, respectively. The mixture (150 g.) was gradually charged to 220 ml. of a 16.7% (w./w.) solution of sodium hydroxide solution and held at 100° F.±20° F. for 16 hours while the mixture was being agitated. The procedure and equipment described in Example I were used. The temperature was increased to 180° F. and agitation was continued while the temperature was maintained at 180° F. for 30 hours.

The procedure was repeated using 150 g. of microspheres calcined at 1800° F. as the sole calcined microspheres and 220 ml. of the 16.7 sodium hydroxide solution. Reaction at 100° F. was for 14 hours and at 180° F. for 10 hours.

In all reaction mixtures the $Na_2O/Al_2O_3$ molar ratio was 0.74/1.

After crystallization, the microspheres were separated from the mother liquor, washed, ion-exchanged with 1 N $NH_4NO_3$ solution and dried. The products were analyzed for chemical composition, zeolite content and zeolite composition. Samples were calcined at 1100° F. and tested for attrition resistance by the "Wig-L-Bug" test described above. Results are summarized in Table I.

Data in Table I show that high alumina content, zeolitic catalysts having outstanding attrition-resistance were obtained from single microspheres or mixture of microspheres. Products obtained from the latter were exceptionally hard.

TABLE I.—PROPERTIES OF CRYSTALLINE FAUJASITE FLUID CATALYST

| | Reactants | | Product | | Chemical analysis, percent | | | Hardness, percent, sec. |
|---|---|---|---|---|---|---|---|---|
| Source of SiO$_2$ and Al$_2$O$_3$ | Concentration of NaOH solution, percent | Zeolite | | SiO$_2$/Al$_2$O$_3$ (molar ratio) of zeolite Y | Al$_2$O$_3$ | SiO$_2$ | Na$_2$O | |
| Microspheres A | 16.7 | 24% Y, 8% B | | 4.73 | 62 | 33 | 1.0 | 1.00 |
| Microspheres A and B | 16.7 | 40% Y, 0% B | | 4.30 | 59 | 36 | 0.83 | 0.55 |

EXAMPLE IV

This example further demonstrates the outstanding properties of a cracking catalyst of the present invention.

The catalyst was obtained as follows. Calcined microspherical preforms were obtained by forming a 60% solids slip of a fine size fraction of high purity hydrated Georgia kaolin clay, the slip containing tetrasodium pyrophosphate as a deflocculating agent in amount of 0.3% based on the clay weight. The slip was spray dried to produce microspheres. The microspheres were calcined at about 1800° F. in a muffle furnace for 2 hours. After the microspheres had cooled they were gradually added to a 15.0% (w./w.) solution of sodium hydroxide, following which a commercial metakaolin pigment was incorporated in amount of 5% based on the weight of the microspheres. The flask containing the reactants was closed with a seal provided with a vent. While the flask was gently shaken, it was immersed in a 100° F. water bath and maintained in the bath for 12 hours. The temperature of the bath was then increased to 180° F. and, while the flask was shaken, the flask was maintained in the 180° F. bath for 12 hours. The contents of the flask were filtered, washed, exchanged with 1 N NH$_4$NO$_3$ solution to a Na$_2$O content of 0.79% and dried.

The ion-exchanged product contained 31.6% zeolite Y having a SiO$_2$/Al$_2$O$_3$ mole ratio of 4.24. Average particle size was 49 microns.

A sample of the ion-exchanged microspheres was dried at 400° F. for 2 hours and then calcined at 1500° F. for 1 hour. Bulk density was 0.89 g./cc. and pore volume was 0.52 g./cc. Hardness by the Wig-L-Bug test was 0.60%/sec.

Another sample of dried ion-exchanged microspheres was activated by heating at 1350° F. for 4 hours in an atmosphere of 100% steam. Catalytic properties were tested by the "Cat-D" procedure at a liquid hourly space velocity (LHSV) of 3.0.

To test the thermal stability, a portion of the steamed microspheres was calcined at 1500° F. for 4 hours in 100% steam and then tested by the "Cat-D" method. Results are summarized in Table II.

TABLE II.—CATALYTIC PROPERTIES OF ZEOLITIC CRACKING CATALYST

| Heat treatment (steam) | 1,350° F./4 hr. | 1,350° F./4 hr. plus 1,500° F./4 hr. |
|---|---|---|
| Gasoline, vol. percent | 60.2 | 66.4 |
| Coke, wt. percent | 6.4 | 2.1 |
| Gas, wt. percent | 25.8 | 14.8 |
| Gas gravity | 1.64 | 1.63 |
| Conversion, wt. percent | 83.1 | 72.9 |

Data in Table II show that the catalyst had high selectivity towards gasoline, low coking properties and excellent stability towards high temperature steam.

We claim:

1. A cracking catalyst composition in the form of attrition-resistant microspheres containing ion-exchanged crystalline faujasite and an amorphous alumina-silica residue of caustic leached calcined kaolin clay which had undergone the kaolin exotherm during calcination, said microspheres analyzing, on a volatile-free weight basis, at least 90% combined SiO$_2$+Al$_2$O$_3$ in a SiO$_2$/Al$_2$O$_3$ molar ratio within the range of 0.8 to 1.4/1.

2. The catalyst product of claim 1 further characterized by analyzing, on a volatile-free weight basis, less than 3% Na$_2$O.

3. The catalyst product of claim 1 analyzing, on a volatile-free weight basis, less than 1% Na$_2$O, from 30% to 50% SiO$_2$ and from 50% to 65% Al$_2$O$_3$, the SiO$_2$/Al$_2$O$_3$ molar ratio of the faujasite constituent being in excess of 4.0.

References Cited

UNITED STATES PATENTS

| 3,337,474 | 8/1967 | Cornelius et al. | 252—455 |
| 3,341,284 | 9/1967 | Young | 252—455 X |
| 3,384,602 | 5/1968 | Robinson | 252—455 |
| 3,506,594 | 4/1970 | Haden, Jr. et al. | 252—455 |
| 3,515,683 | 6/1970 | Flank et al. | 252—455 |

CARL F. DEES, Primary Examiner

U.S. Cl. X.R.

23—113